(12) United States Patent
Steinhardt

(10) Patent No.: US 6,808,586 B1
(45) Date of Patent: Oct. 26, 2004

(54) APPLICATOR FOR AND METHOD OF APPLYING A SHEET MATERIAL TO A SUBSTRATE

(75) Inventor: Mark John Steinhardt, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/458,520

(22) Filed: Jun. 10, 2003

(51) Int. Cl.[7] .......................... B32B 31/18; B32B 35/00
(52) U.S. Cl. .................... 156/269; 156/379.8; 156/526; 156/574; 156/576; 156/577; 222/43; 222/80
(58) Field of Search .................... 156/71, 160, 250, 156/269, 379.8, 360.6, 380.7, 510, 526, 574, 576, 577, 580, 581; 222/80, 83, 83.5, 89, 90, 43, 245

(56) References Cited

U.S. PATENT DOCUMENTS

| | | |
|---|---|---|
| 1,960,850 A | 5/1934 | Lloyd |
| 2,357,992 A | 9/1944 | Banghart |
| 3,969,181 A | 7/1976 | Seabold |
| 4,255,218 A | 3/1981 | Stageberg |
| 4,711,682 A | 12/1987 | Barbe et al. |
| 4,806,184 A | 2/1989 | Shannon |
| 5,050,529 A | 9/1991 | Pardee |
| 5,312,501 A | 5/1994 | Gruber et al. |
| 5,316,613 A | 5/1994 | Samuelson et al. |
| 5,478,432 A | 12/1995 | Vester |
| 5,573,630 A | 11/1996 | Edney et al. |
| 5,759,270 A | 6/1998 | Lee |
| 5,824,363 A | 10/1998 | Poole et al. |
| 6,059,002 A | 5/2000 | Katami |
| 6,062,287 A | 5/2000 | Ernest |
| 6,145,770 A | 11/2000 | Manusch et al. |
| 6,206,990 B1 | 3/2001 | Glenn |
| 6,450,228 B1 | 9/2002 | McLeod et al. |
| 6,450,231 B1 | 9/2002 | Ishikawa |

Primary Examiner—Melvin C Mayes
Assistant Examiner—Sing Po Chan
(74) Attorney, Agent, or Firm—Larry L. Huston; Leonard W. Lewis; Steven W. Miller

(57) ABSTRACT

A method and device for applying sheet material, such as wallpaper, to a substrate. The applicator is bi-positionable, having a first position where the sheet material is spaced apart from the substrate and a second position where the sheet material contact the substrate. Additionally or alternatively, the applicator may be provided with a control bar. In the first position, the control bar contacts a portion of the sheet material such as its free end. This minimizes the chance of the sheet material prematurely contacting the substrate. In the second position, the sheet material is disengaged from the control bar for application to the substrate. The applicator and sheet material may be provided together in a kit.

17 Claims, 3 Drawing Sheets

APPLICATOR FOR AND METHOD OF APPLYING A SHEET MATERIAL TO A SUBSTRATE

FIELD OF INVENTION

This invention relates to applicators for applying a sheet material to a substrate and also to a method of applying a sheet material to a substrate.

BACKGROUND OF THE INVENTION

Sheet materials are commonly used in everyday life. Examples of sheet materials include wallpaper, billboards, posters and advertisements which are typically applied to vertical surfaces. Other examples include linoleum and other flooring, which are typically applied to horizontal surfaces. Sheet materials may be applied to other sheet materials, i.e., a lamina, to make laminate materials. The laminate materials are then put to the end use. The substrate may also be portable, as in the case of an open container or package.

The art teaches various techniques for applying sheet materials to substrates. For example, some attempts in the art use a knife-edge applicator in an attempt to have a clean break of the sheet material from the applicator to the substrate. Examples in the art include U.S. Pat. Nos. 5,759,270, iss. Jun. 2, 1998 to Lee; 6,059,002, iss. May 9, 2000 to Katami; 6,145,770, iss. Nov. 14, 2000 to Manusch et al.; and 6,450,231 B1, iss. Sep. 17, 2002 to Ishikawa.

Other attempts in the art use a polygonal device to apply wallpaper to a flat surface or a semi-cylindrical curved tube as found in U.S. Pat. Nos. 4,711,682, iss. Dec. 8, 1987 to Barbe et al. and 4,806,184, iss. Feb. 21, 1989 to Shannon, respectively. Shannon further teaches a hand-held wallpaper applicator for applying wallpaper. This applicator has a tensioning mechanism for applying resilient pressure to the sheet material as it is scrolled onto the wall. U.S. Pat. No. 1,960,850, iss. May 29, 1934 to Lloyd teaches a wallpapering machine having a hinged handle. However, none of the aforementioned art addresses the problem of properly positioning the sheet material to be applied on the substrate. If the user wishes to ensure the sheet material is level, is accurately disposed in a corner, etc., special care must be taken with the initial positioning of the sheet material. This problem is exacerbated if the sheet material has pre-applied adhesive, as is often done for convenience.

One attempt to overcome the problems associated with positioning of the sheet material is found in U.S. Pat. No. 5,478,432, iss. Dec. 26, 1995 to Vester, which discloses a wallpaper border applicator having a tack-applier assembly. The assembly is placed in position and retractable tacks inserted into the wall. However, Vester still does not approach the problem of initially positioning the sheet material to be applied and the tacks may damage the wall. If the sheet material is mispositioned at the outset, continuing the mispositioning is not helpful.

One attempt to overcome the problems of mispositioning and maintaining level is found in U.S. Pat. No. 6,206,990 B1, iss. Mar. 27, 2001 to Glenn. Glenn provides an apparatus for applying a masking element having two vertical columns and a dispenser carried laterally therebetween. A level is provided on the dispenser. However, the Glenn apparatus is neither portable, nor suitable for use with smaller amounts of sheet material, e.g., posters, advertisements, etc. Further, Glenn does not provide for use with odd-shaped surfaces.

Yet another attempt in the art to provide dispensing of transfer adhesive is U.S. Pat. No. 5,316,613, iss. May 31, 1994 to Samuelson et al. Samuelson provides a dispenser which applies transfer adhesive to a substrate using an application member. However, Samuelson fails to provide a way to place the adhesive in a corner, or dispense adhesive of indeterminate lengths.

Accordingly, there exists a need in the art to provide a convenient sheet material applicator, particularly a sheet material applicator which allows for conveniently properly positioning and repositioning, as necessary, the sheet material relative to the substrate.

SUMMARY OF THE INVENTION

This invention comprises a bi-positionable applicator for applying a sheet material to a substrate. The applicator comprises a holder for receiving a quantity of sheet material. The holder is operably juxtaposed with a frame. The holder and frame are movable relative to each other from a first position to a second position. In the first position, the frame engages at least one of the sheet material and the substrate. In the second position, the frame disengages the at least one of the sheet material and the substrate.

In another embodiment, the claimed invention comprises a method for applying a sheet material to a substrate. The method comprises the steps of providing a bi-positionable applicator. The applicator comprises a holder for receiving a quantity of sheet material. The holder is juxtaposed with a frame, wherein the holder and frame are movable relative to each other from a first position to a second position. The frame engages the sheet material and/or the substrate when the holder and frame are placed in the first position. A quantity of sheet material is inserted into the holder. The applicator is placed against the substrate, whereby the sheet material is spaced apart from the substrate. If desired, standoffs may be used to space the sheet material apart from the substrate. The sheet material may be adjusted to achieve the desired position and orientation relative to the substrate. The holder and frame are moved from the first position to the second position whereby the sheet material then contacts the substrate and/or the frame disengages the sheet material. The applicator is moved in a direction to apply the sheet material to the substrate. Optionally, the holder and frame may then be moved from the second position to the first position whereby a portion of the sheet material may be spaced apart from the substrate. This portion of the sheet material may then be cut or otherwise severed through lines of weakness, etc., to release the balance of the sheet material from the portion of the sheet material applied to the substrate. Additionally or alternatively, the frame may reengage the substrate.

BRIEF DESCRIPTION OF THE DRAWINGS

FIGS. 1A and 2 omit the sheet material for clarity.

DETAILED DESCRIPTION OF THE INVENTION

Figure 1A:
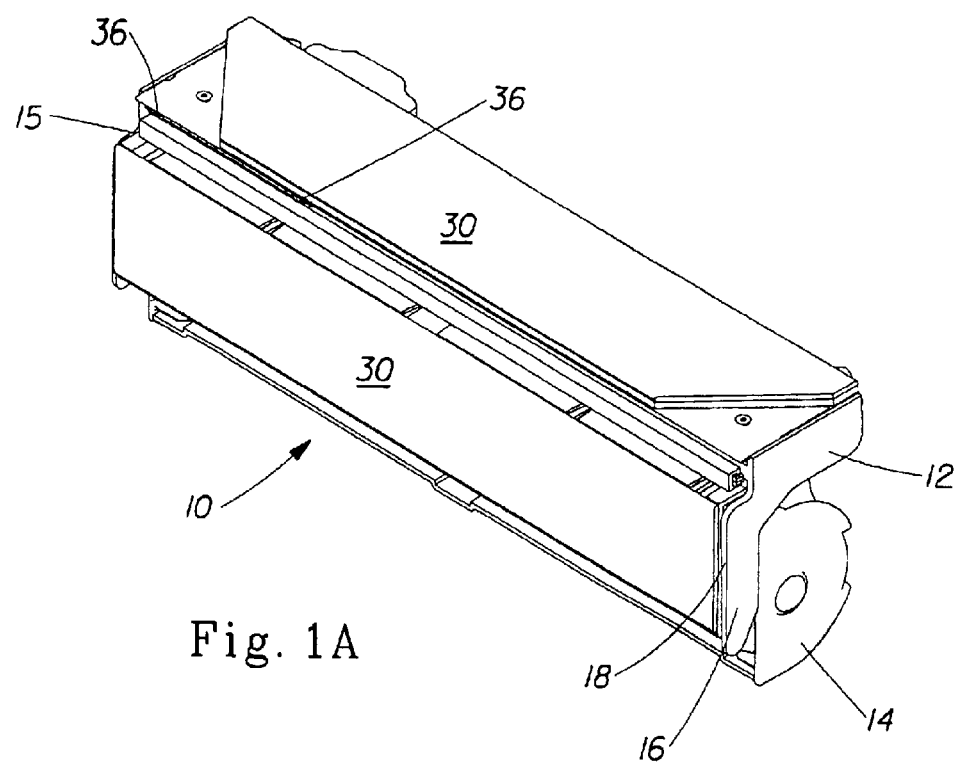
FIGS. 1A-1B are perspective views of an applicator according to the present invention.
Figure 1B:
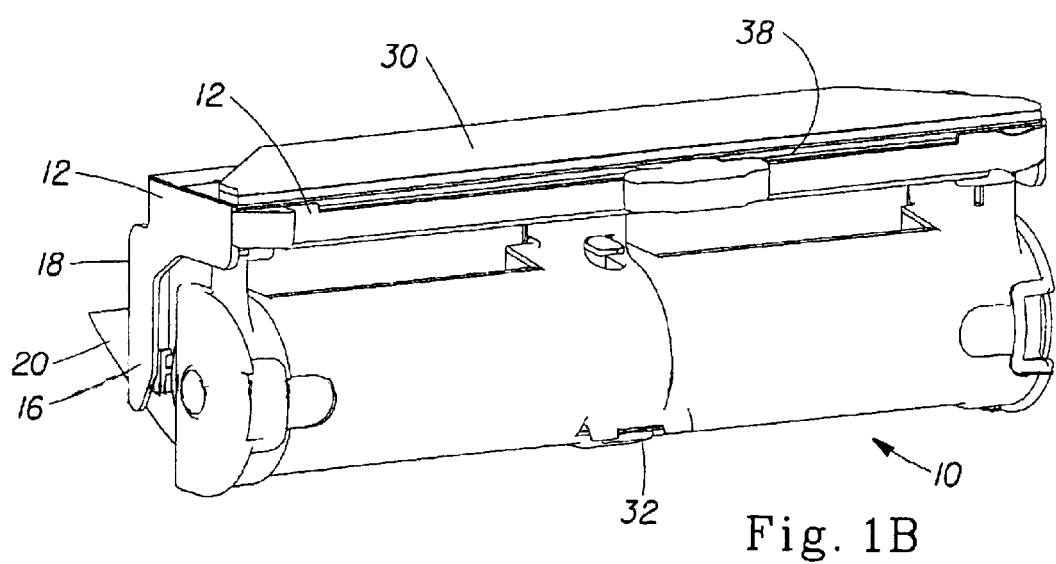

Referring to FIGS. 1A-1B, the invention comprises an applicator 10 for applying a sheet material 20 to a substrate.

The substrate may be stationary or portable, reusable or disposable, as desired. The substrate may be a product or material 20 adapted for its final use, such as a wall, floor, bowl, open container, or billboard. Alternatively, the substrate may be an intermediate, such as one or more laminae of a laminate. The substrate may be flat and rectilinear, curvilinear, of regular or irregular shape, size and/or texture, as desired.

The sheet material 20 may comprise wallpaper, wrapping paper, film, a protective layer, food covering, paper, nonwoven, architectural adhesive films, visually or tactilely perceptible indicia, labels, tape, transfer adhesive, etc. The material 20 may be supplied in the form of a volute spool, such as a spiral wound roll, as is known in the art and as further discussed herein. The sheet material 20 may be wound onto a core, or wound without a core, as desired. A spool of such material 20 may be rotatably mounted in the applicator 10. However, it is to be recognized that a quantity of the sheet material 20 may include one or more discrete or flat sheets of material 20 inserted into the applicator 10.

The material 20 has a width, taken parallel to the longitudinal axis of the spool, and a length, taken parallel to the direction of application of the sheet material 20 onto the substrate. The material 20 further has a thickness, which may be any thickness sufficient to allow for bending of the material 20 during the application process and which provides the desired functionality in use. Preferably the material 20 has thickness of 0.076 mm or less.

The material 20 to be applied has a free end. The free end of the material 20 is the portion of the material 20 which is discrete and is typically the first portion of the material 20 to be applied to the substrate during a given application. The material 20 is removably mounted into the applicator 10. The material 20 may be dispensed until depleted by application to the substrate or, alternatively, may be removed when it is desired to apply a different material 20 to the same or different substrate.

The applicator 10 may be stationary or portable, as desired. Preferably, the applicator 10 is portable, so that it can conveniently apply sheet materials 20 in a desired pattern with minimal set-up. Sheet material 20 may be manually applied from the applicator 10, may be dispensed using a drive motor, and/or may be applied automatically using robotic systems as is known in the art.

The applicator 10 is generally elongate, and has a major axis parallel to the width of the material 20 to be applied and the longitudinal axis of a spool of sheet material inserted into the holder 14. The length of the applicator 10, taken along the major axis, should be great enough to accommodate any desired width of material 20 to be applied. It is to be recognized that the material 20 may be of significantly lesser width than the length of the applicator 10 and that multiple sheets of material 20, each having a width less than the length of the applicator 10, may be simultaneously applied in parallel or sequentially applied in series. If such an arrangement is selected, the materials 20 may be simultaneously applied to a substrate, and the materials 20 may be the same or different, as desired.

Figure 2:
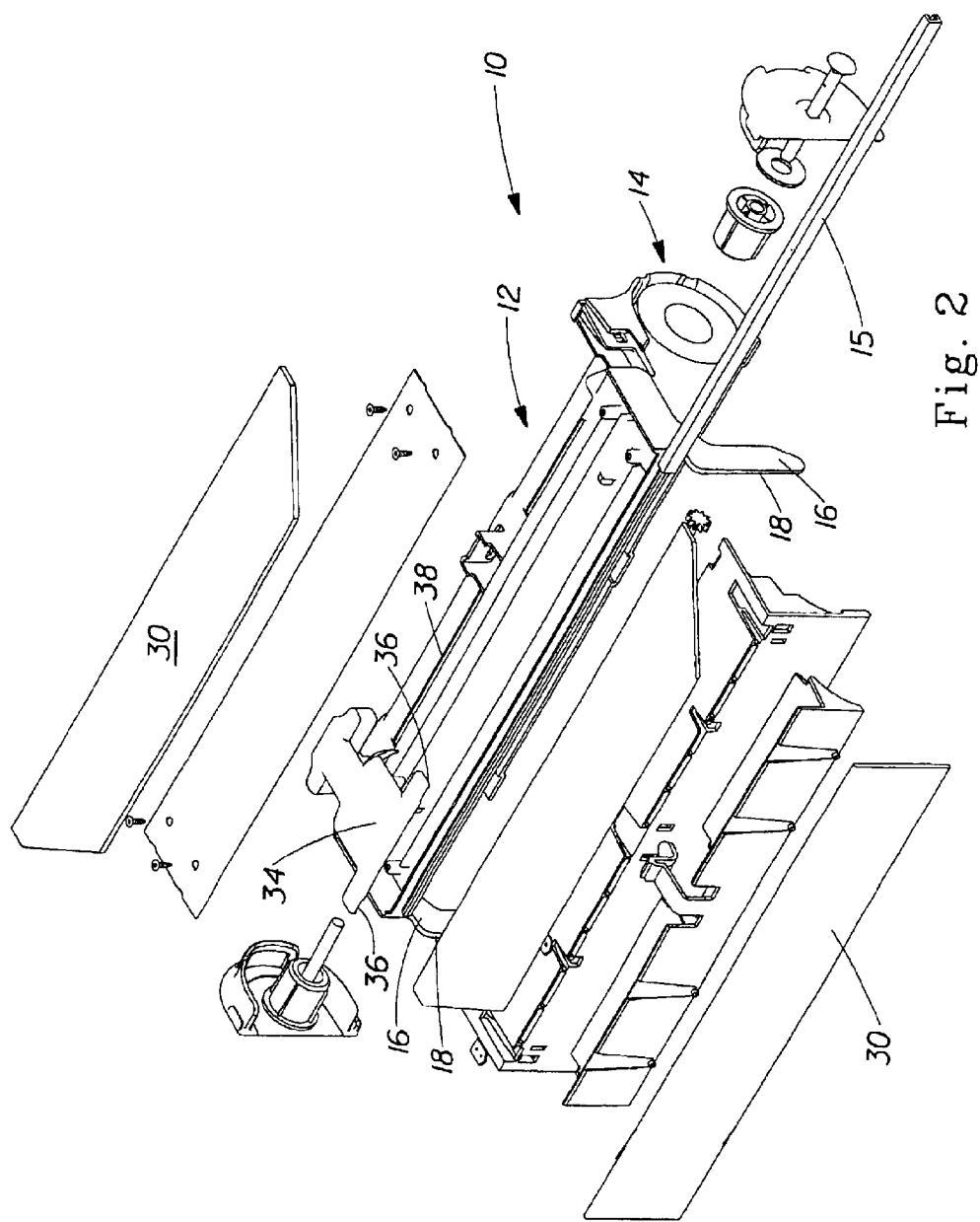
FIG. 2 is an exploded sectional view of the applicator of FIGS. 1A-1B.

Referring to FIG. 2, the applicator 10 according to the present invention comprises a frame 12 and a holder 14. The frame 12 and the holder 14 are movable relative to one another. Either the frame 12 or the holder 14 may move, while the other is held stationary or each may move relative to the other. The holder 14 comprises any device suitable for holding the material 20 to be applied to the substrate immediately prior to its application. The holder 14 may be elongate and completely or partially enclose the material 20 to protect it from dirt or other contamination between applications and during storage. However, it is not necessary that the material 20 be covered at all. The holder 14 further may comprise one or more rotatable mountings for a spool of the sheet material 20. The rotatable mountings may include trunnions, journals, bearings, a central axle, etc., all of which are known in the art for mounting a spool of sheet material 20 to a holder 14.

Two rotatable mountings may be included, one at each end of the holder 14. If desired, the two rotatable mountings may be coupled together with gears, etc., to improve tracking of the applicator 10 as it applies the material 20. If desired, the rotatable mountings may be loaded or biased to provide braking action, so that the material 20 is not applied too quickly and mistakes are minimized. If the braking action is strong enough, the applicator 10 and material 20 may hang on the wall for a brief period of time, allowing the user to reposition, gather other tools, etc.

Figure 3A:
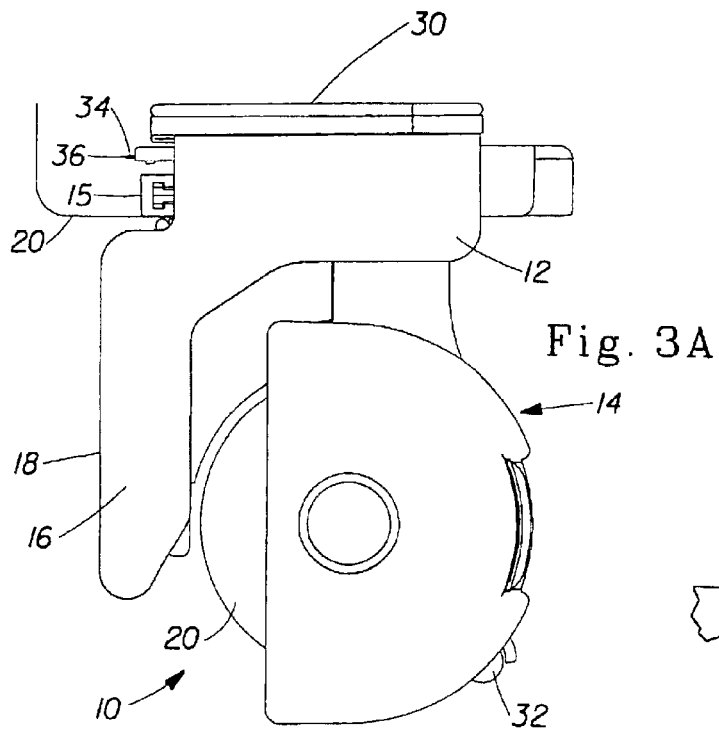
FIGS. 3A-3B are sectional views showing the applicator in the first and second positions.
Figure 3B:
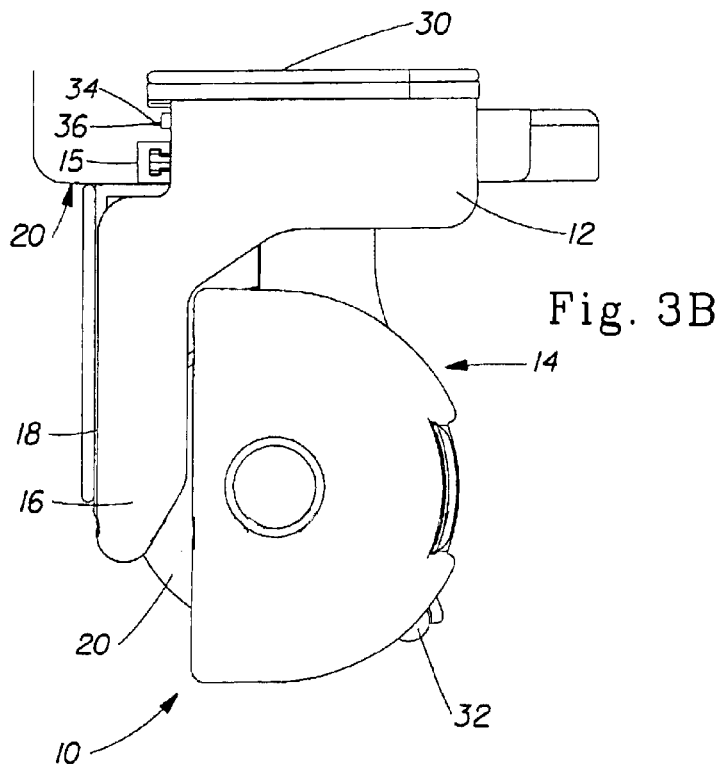

The frame 12 may also comprise an elongate structure for holding one or more standoffs 16 and/or a control bar 15. The frame 12 and holder 14 are movable relative to each other from a first position to a second position. If desired, the frame 12 and holder 14 may be maintained at a position intermediate the first and second positions, although this is generally not desired. Movement of the frame 12 and holder 14 relative to each other can be accomplished by slidable translation as illustrated in FIGS. 3A-3B. This arrangement may be simply accomplished using grooves and tracks as are well known in the art. If desired, a rack and pinion gear set may be used to guide the motion of the frame 12 and holder 14.

Referring back to FIG. 2, the standoffs 16 provide displacement of the material 20 away from the substrate immediately prior to application. The standoffs 16 have a leading edge 18 which engages the substrate. The leading edge 18 of the standoffs 16 may be provided with a soft material 20 to prevent marring or damage to the substrate. The standoffs 16 may engage the substrate by direct contact. When the standoffs 16 engage the substrate, the sheet material 20 is spaced apart from the substrate so that premature application of the sheet material 20 is avoided. The standoffs 16 may provide for point contact of the frame 12 against the substrate or, preferably, may provide for elongate contact against the substrate as shown, to ensure secure engagement of the frame 12 with the substrate. In a preferred embodiment, two standoffs 16 are provided, one at each end of the frame 12. Preferably, the standoffs 16 are disposed outboard, in the width direction, of the sheet material 20. This arrangement avoids direct contact of the standoffs 16 with the sheet material 20 to minimize tearing.

While a single frame 12 having two rigidly mounted standoffs 16 is illustrated, in an alternative embodiment the standoffs 16 may be separately and individually mounted to the frame 12. This arrangement allows for individual movement of the standoffs 16 relative to each other, if desired, for example, to apply sheet material 20 of variable thickness across its width to a substrate or one does not otherwise wish to utilize a direct and flat application of the sheet material 20 to the substrate. In such a configuration, one standoff 16 may be mounted to each end of the holder 14. In such an embodiment, each standoff 16 is considered to have its own frame 12 mounted to the holder 14. Each standoff 16 is separately engageable with and retractable from the substrate in such an embodiment. This arrangement provides the advantage that a material 20 savings occurs, but the disadvantage that a single movement of the frame 12 cannot engage the standoffs 16 with the substrate or retract the standoffs 16 from the substrate.

The applicator 10 according to the present invention may also comprise a control bar 15. The control bar 15 is preferably elongate, parallel to the longitudinal axis of the holder 14, and may be mounted on the frame 12. The control bar 15 engages and disengages the sheet material 20, and preferably the free end of the sheet material 20 or a portion of the sheet material 20 juxtaposed therewith. Preferably the control bar 15 has a length equal to or greater than the width of the sheet material 20. The control bar 15 may have vacuum, adhesive, a coating which is cohesive with the sheet material 20 to be applied, hook and loop fasteners, or other coatings which are suitable for contacting, gripping or otherwise engaging the sheet material 20 to be applied. The coatings, vacuum, etc., may be durable or replaceable as desired. Further, the coatings or vacuum may be continuously or discontinuously applied across the length of the control bar 15 and hence across the width of the sheet material 20.

Referring to FIGS. 3A-3B, in a preferred embodiment, the control bar 15 has an adhesive coating, providing for adhesive attachment of the control bar 15 to the sheet material 20. If a geometry having generally perpendicularly oriented burnishes 30 is selected, as illustrated herein, care should be taken that the control bar 15 does not engage the sheet material 20 as it is applied to the substrate. To prevent this from occurring, a portion of the control bar 15 may be provided without adhesive, or removed therefrom. This may be accomplished by displacing the control bar 15 slightly towards the spool of material 20, as shown.

The engagement of the control bar 15 may be constant or variable across the width of the sheet material 20. For example, greater control of the sheet material 20 near the edges may be desired and, therefore, greater engagement may be necessary near the edges, near the center, or in one direction taken across the width, as desired. However, it is only necessary that the control bar 15 be engageable with and retractable from the sheet material 20, as desired.

Preferably, the control bar 15 and standoffs 16 are simultaneously engageable and disengageable from the sheet material 20 and the substrate, respectively, and more preferably that such engagement and disengagement occur in a single motion. However, one of skill will recognize that the control bar 15 and each or both standoffs 16 may be independently engaged and retracted.

If desired, the applicator 10 may be provided with a latch. The latch locks the frame 12 and holder 14 in the first position relative to each other, the second position, an intermediate position, and/or any combination thereof. Suitable latches include those which provide for frictional locking of the frame 12 and holder 14 relative to each other, a mechanical interlock, adhesion, cam action, hook and loop fasteners, etc. The latch may be operated as a push-button, buckle, clip, etc. Suitable latches are known to those of ordinary skill and will not be further described here.

If desired, the applicator 10 may be further provided with a burnish 30. The burnish 30 may be disposed on the frame 12, the holder 14 or both. A burnish 30 is any surface or surfaces of the applicator 10 which provides for smoothing of the sheet material 20 when it is applied to the substrate, further presses the sheet material 20 and substrate together, and/or further ensures good engagement of the sheet material 20 and substrate without wrinkling, undue folds or misalignment due to stretching, etc. The surface may be flat or curvilinear and preferably convex.

The applicator 10 may have two or more separate burnishes 30 as illustrated in FIGS. 1A-1B. The burnishes 30 may be disposed 90° apart as shown, or may be disposed at any other convenient orientation. If more than one burnish 30 is provided, the burnishes 30 may comprise different surfaces. For example, a coarse burnish 30 may be used to assist with the initial application of the sheet material 20 to the substrate, a fine burnish 30 may be used to later assist in the application, etc.

It has been found that there is an inverse relationship between the width of the sheet material 20 and the preferred length of the burnish 30, the length of the burnish 30 being taken in the direction of application of and parallel to the length of the sheet material 20. As the sheet material 20 becomes wider, the length of the burnish 30 in the direction of material 20 application should generally increase to provide adequate control for the sheet material 20. As the width of the sheet material 20 and/or length of the burnish 30 decrease, the user has greater control over the application of the sheet material 20 for steering and accommodating arcs or a curvilinear path as the sheet material 20 is applied.

For the embodiment described herein, a two-ply polymeric sheet material 20 having a removable PET carrier sheet having a width of approximately 29.5 cm, and a burnish 30 having a length of at least about 3.8 cm has been found suitable. The burnish 30 is provided with a stiff felt pile.

The applicator 10 may provide a generally cylindrical holder 14, conveniently grasped by the user. The holder 14 is nested in the included angle formed between two separate burnishes 30. If the user applies the substrate to a vertical surface and starts at the top of the surface, as the applicator 10 approaches the bottom of the substrate, the user may conveniently roll the applicator 10 forward from the first burnish 30 to the second burnish 30. This provides an ergonomically efficient design, allowing the user to maintain accurate positioning of the applicator 10 as it applies the material 20 to various heights of the substrate.

If desired, the applicator 10 may further comprise a level 32. The level 32 may be disposed on the frame 12, the holder 14, or some other part of the applicator 10, as desired. The level 32 may be utilized to indicate horizontal orientation, vertical orientation, a 45° orientation, any intermediate orientation, or a combination thereof. A simple bubble level 32 and/or laser level 32 may be utilized, as is known to one of ordinary skill.

If desired, the applicator 10 may further comprise a knife 34, such as a blade, cutting wheel, hot wire, heated edge, etc. The knife 34 may be mounted to the holder 14, frame 12, a combination thereof, or another component on the applicator 10.

While it is generally preferred that cutting occur parallel to the width of the sheet material 20, the direction of cut may be skewed relative to the width of the sheet material 20, and need not be straight. A jagged or curvilinear cut may occur, if desired.

In a preferred embodiment, the knife 34 is mounted to the frame 12 and bilaterally traverses a track 38 so that cutting may occur in either direction across the width of the material 20. In a particularly preferred embodiment, the knife 34 may retract from the direction of cutting of the sheet material 20 at each end of the track 38. Preferably, in such an embodiment, the ends of the track 38 are outboard of the sheet material 20 as taken in the width direction. If desired, the knife 34 may be biased so that it retracts automatically at either, and preferably both, ends of the track 38. Biasing may be done by a spring, gravity influence, cam action, magnetic attraction, etc.

Certain sheet materials 20 may not sever easily when cutting by the knife 34 is attempted. For example, thin polymeric materials 20 may have a tendency to bunch and wrinkle, rather than cleanly sever. This provides an uneven or unsightly appearance when the material 20 is applied to the substrate.

Figure 4A:
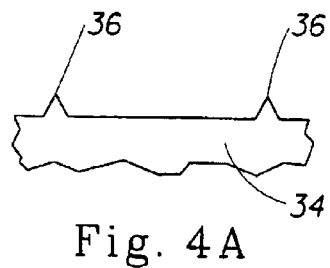
FIGS. 4A-4B are fragmentary top plan views of two exemplary knives usable with the present invention.
Figure 4B:
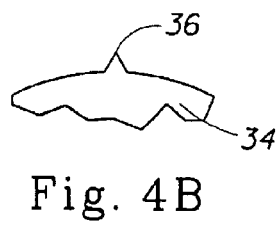

Referring to FIGS. 4A-4B, to overcome this problem, a knife 34 may be provided which, in sequence, punctures then severs the sheet material 20. This may be accomplished by providing a knife 34 having two or more spaced apart prongs or discrete cutting points 36. The first prong is inserted into the sheet material 20 at a position inboard of the edge of the sheet material 20. The knife 34 is moved laterally in the cutting direction and may be guided by a track 38. The second discrete cutting point 36 on the knife 34 then cuts the remaining section which was uncut and further provides an additional point for severing any sheet material 20 left uncut by the first discrete cutting point 36.

Referring to FIG. 4A, a knife 34 having two cutting points 36 may be utilized. The first cutting point 36 punctures the material 20, and the second cutting point 36 severs the material 20 as the knife 34 is moved transversely across the material 20.

Referring to FIG. 4B, the cutting point 36 of the knife 34 may be generally centered on the sheet material 20. The knife 34 is then advanced perpendicularly to the sheet material 20, rather than moved laterally. Severing of the material 20 then occurs bilaterally out from the center of the sheet material 20. This knife 34 may have additional cutting points 36 or serrations.

Referring back to FIGS. 1A-1B, if desired, the need for a knife 34 can be obviated by providing sheet material 20 with discrete lines of weakness (not shown) spaced apart along the length of the sheet material 20. This arrangement may be advantageous when the sheet material 20 is intended to be used for pre-sized applications, such as occurs when the sheet material 20 contains advertisement, decorative effects sized to cover light switches, etc. The lines of weakness may be provided by perforations, thin sections within the material 20, etc., as are known in the art.

One of skill will recognize that the sheet material 20 may be adhesively coated on the side which contacts the substrate. This provides for convenient application of the sheet material 20 to the substrate. Alternatively, the adhesive may be activated by water during application to the substrate, or may even be applied to the face of the sheet material 20 during application, as are known in the art. In yet another embodiment, the sheet material 20 may have a carrier strip disposed on one side, as is known in the art. The carrier strip is removed upon application of the sheet material 20 to the substrate. If desired, the applicator 10 may further comprise a take-up roll for convenient spooling of the carrier strip as it is removed from the sheet material 20. The take-up roll may be biased to maintain tension of the carrier strip as it is wound thereon.

If an embodiment utilizing a carrier film and sheet material 20 is selected, preferably the applicator 10 provides for extended contact of the sheet material 20 and carrier film upon application to the substrate. Contrary to the knife edge, attempts in the art described above, Applicants have found that extended contact in the direction of application of the sheet material 20 and carrier film prior to separation of the carrier film from the sheet material 20, improves the tracking and positioning of the sheet material 20 on the substrate. A coextensive distance of at least 2.5 cm, and more preferably at least 3.8 cm, as taken in the application direction, has been found to work well for application of the carrier strip and sheet material 20 to the substrate.

While the relative motion of the holder 14 and frame 12 of the applicator 10 has been described above as translation enabled by sliding of the holder 14 and frame 12 relative to the other, the invention is not so limited. Relative motion between the frame 12 and holder 14 may also be accomplished by pivoting either or both of the frame 12 and holder 14 relative to the other. The pivot may be about an axis generally parallel to the width of the sheet material 20 and the longitudinal axis of the applicator 10.

The pivot motion may subtend a limited arc. The arc may start at a first position which allows the sheet material 20 to be spaced apart from the substrate when the standoffs 16 are engaged with the substrate and/or, likewise, may allow a portion of the sheet material 20, such as the free end of the sheet material 20, to be engaged with the control bar 15 while in the first position. Upon articulating the applicator 10 from the first position to the second position, the sheet material 20 engages the substrate and/or the sheet material 20 disengages from the control bar 15. Thus, in the pivotable execution, the applicator 10 bilaterally articulates between the first and second positions, as described above and provides the same functionality as described above.

In operation, the sheet material 20 is inserted into the holder 14. The sheet material 20 may comprise a spool which is spiral wound, discrete or endwise connected flat sheets, or any other desired configuration. The applicator 10 is placed into the first position as described above. The applicator 10 is placed against the substrate, so that one or more of the standoffs 16 engage the substrate and are in contact therewith. The sheet material 20 is spaced apart from the substrate. The applicator 10 is then adjusted for the position and desired location of the sheet material 20. By having the sheet material 20 spaced apart from the substrate, easy adjustment can occur, even when the sheet material 20 is provided with an adhesive coating for the convenience of the user. In the first position, the control bar 15 engages the sheet material 20, preferably at a position juxtaposed with its free end. Of course, one will recognize that the applicator 10 need not have both a control bar 15 and standoffs 16. Providing either will enable the user to conveniently adjust the position of the sheet material 20 on the substrate without prematurely contacting the sheet material 20 to the substrate.

The frame 12 and holder 14 are moved from the first position to the second position. In the second position, the standoffs 16 are retracted or otherwise disengaged from the substrate. The sheet material 20 then contacts or otherwise engages the substrate. Alternatively or additionally, upon moving the frame 12 and holder 14 from the first position to the second position, the control bar 15 is retracted from or otherwise disengages the sheet material 20. This also allows the sheet material 20 to be engaged with the substrate. A quantity of the sheet material 20 is then applied to the substrate. The quantity may be determinate, such as occurs when a predetermined length is dispensed, or the quantity of sheet material 20 may be indeterminate, such as may occur when a quantity of the sheet material 20 is applied to the substrate along a wall and cut at a desired point. The desired point may occur at a midpoint on the wall, when a baseboard is reached, etc.

If the sheet material 20 does not have lines of weakness or a determinate length, the sheet material 20 is then cut so that a quantity remains in the holder 14 and the portion of (he sheet material 20 applied to the substrate is separable from the applicator 10. In a preferred operation, the frame 12 and holder 14 are returned from the second position to the first position. This pulls the sheet material 20 away from the substrate, thereby tensioning the sheet material 20 for convenient cutting by the knife 34. Additionally or alternatively, the control bar 15 engages the portion of the sheet material 20 which becomes the free end upon cutting. The operation may then be repeated as desired.

The operation and applicator 10 described and claimed herein provide the advantage that control of the sheet material 20 may be maintained at all times. The sheet material 20 is either engaged by the control bar 15, while it is not being applied or, alternatively, is engaged by the substrate when the sheet material 20 is applied. Upon termination of application to the substrate, the control bar 15 again reengages the sheet material 20. Separately, the frame 12 of the applicator 10 may engage either the sheet material 20, or the substrate, or both. This arrangement allows the frame 12 to not only control the sheet material 20 through the control bar 15, control the spacing of the sheet material 20 from the substrate, through the standoffs 16, but also allows for disengagement of either or both independently or together, as desired.

If desired, the applicator 10 and sheet material 20 may be supplied as a kit. The kit may include one or more applicators 10, and one or more quantities of sheet material 20 usable with the applicator 10. This arrangement provides the advantage that the user has the applicator 10 for extended and multiple uses, and can replenish the sheet material 20 as needed. The sheet material 20 can be replenished when it is exhausted, or when different colors, sizes, thicknesses, protective qualities, or other properties of the sheet material 20 are desired. Each different type or sheet material 20 can be used with a single applicator 10. The applicators 10 may be differently sized, to handle greater or lesser quantities of the same sheet material 20, may be proportioned accommodate sheet materials 20 of greater thicknesses, stiffnesses, etc.

If desired, the kit may further include a device for separating the sheet material 20 and carrier film. One suitable device which is found to work well is a device comprising a handle and rotatable roller, resembling a paint roller. The roller is provided with adhesive on the circumference. Using the handle, the user rolls the roller of the device across an edge of the sheet material 20 after it has been applied to the substrate. The adhesive of the roller picks up the edge, and preferably the corner, of the carrier film allowing it to be easily grasped by the user for complete removal from the sheet material 20.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A bi-positionable applicator for applying a sheet material to a substrate, said applicator comprising:
a holder for receiving a quantity of sheet material therein;
said holder being disposed on a frame, said holder and said frame being movable relative to each other from a first position to a second position,
whereby said frame engages at least one of the sheet material and the substrate in said first position and disengages the sheet material or substrate in second position and allows the sheet material to be applied to the said substrate.

2. A bi-positionable applicator according to claim 1, wherein said frame comprises at least one standoff, said at least one standoff being disposable against the substrate to which the sheet material is to be applied and thereby engage the substrate when said frame and said holder are in said first position, said standoff being retracted from the substrate when said frame and said holder are moved to said second position.

3. A bi-positionable applicator according to claim 2, wherein said holder and said frame are slidably translatable from said first position to said second position.

4. A bi-positionable applicator according to claim 3, further comprising a latch for locking said holder in said first position, said second position, or both.

5. A bi-positionable applicator according to claim 2, wherein said holder is sized for holding a sheet material having a first width, said frame further comprising two spaced apart standoffs, said standoffs being spaced apart a second width, said second width being greater than said first width.

6. A bi-positionable applicator according to claim 5, further comprising a level.

7. A bi-positionable applicator according to claim 1, for dispensing a sheet material supplied in laminated relationship with a carrier film, said applicator further comprising a take-up roll, said take-up roll winding the carrier film thereon when the sheet material is disposed on said substrate, whereby said sheet material and said carrier film remain disposed in said laminated relationship for a length of at least 2.5 cm when the sheet material is applied to said substrate.

8. A bi-positionable applicator according to claim 1, wherein the sheet material has a free end, said frame further comprising an elongate control bar for attaching the free end of the sheet material thereto when said frame and said holder are in said first position, said free end of said sheet material being released from said control bar when said frame and said holder are in said second position.

9. A bi-positionable applicator according to claim 8, further comprising a burnish, said burnish contacting the exposed face of the sheet material while said sheet material is being applied to the substrate.

10. A bi-positionable applicator according to claim 9, further comprising a second burnish, said first burnish and said second burnish being disposed in angular relationship to each other.

11. A bi-positionable applicator according to claim 9, wherein said burnish has a curvilinear surface, said curvilinear surface being convex relative to the sheet material while the sheet material is being applied.

12. A bi-positionable applicator according to claim 1, further comprising a knife, said knife cutting sheet material applied to the substrate from sheet material remaining in said applicator.

13. A method for applying a sheet material to a substrate, said sheet material having a width, said method comprising the steps of:
providing a bi-positionable applicator, said applicator comprising a holder for receiving a quantity of sheet material therein;
said holder being disposed on a frame, said holder and said frame being movable relative to each other from a first position to a second position, whereby said frame engages said sheet material and the substrate when said holder and said frame are in said first position;

inserting a quantity of sheet material into said holder;

placing said applicator against the substrate, whereby said sheet material is spaced apart from said substrate;

moving said holder and said frame from said first position to said second position, whereby said sheet material contacts said substrate;

moving said applicator in an application direction, whereby said sheet material is applied to the substrate;

returning said holder and said frame from said second position to said first position, whereby said frame engages said sheet material; and cutting said sheet material.

14. A method according to claim 13, further comprising the step of adjusting the position of said applicator and said sheet material prior to the step of applying said sheet material to said substrate.

15. A method according to claim 14, wherein said step of adjusting the position of said applicator and said sheet material relative to said substrate comprises the step of using a level to determine the position of said applicator and said sheet material relative to the horizontal or vertical.

16. A method according to claim 13, wherein said step of cutting said sheet material comprises the step of translatably sliding a knife in a direction parallel to the width of said sheet material.

17. A method according to claim 16, wherein said sheet material has first and second opposed edges separated by a width, wherein said step of cutting said sheet material comprises the step of disposing said knife near one edge of said sheet material in a retracted position;

moving said knife from said retracted position to a cutting position;

translatably sliding said knife across said sheet material; and retracting said knife at a position near the other edge of said sheet material.

* * * * *

UNITED STATES PATENT AND TRADEMARK OFFICE
CERTIFICATE OF CORRECTION

PATENT NO. : 6,808,586 B1
DATED : October 26, 2004
INVENTOR(S) : Steinhardt

It is certified that error appears in the above-identified patent and that said Letters Patent is hereby corrected as shown below:

Column 8,
Line 16, delete "arc" and insert therefor -- are --.
Line 67, delete "(he" and insert therefor -- the --.

Column 10,
Line 3, after "in" and before "second", please insert -- said --.

Signed and Sealed this

First Day of February, 2005

JON W. DUDAS
*Director of the United States Patent and Trademark Office*